(12) United States Patent
Liu (10) Patent No.: US 10,207,716 B2
(45) Date of Patent: Feb. 19, 2019

(54) INTEGRATED VEHICLE MONITORING SYSTEM

(71) Applicant: Shanghai Xiaoyi Technology Co., Ltd., Shanghai (CN)

(72) Inventor: Yi Liu, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/873,511

(22) Filed: Jan. 17, 2018

(65) Prior Publication Data

US 2019/0009786 A1    Jan. 10, 2019

(30) Foreign Application Priority Data

Jul. 6, 2017   (CN) .......................... 2017 1 0547320

(51) Int. Cl.
*G08B 23/00*    (2006.01)
*B60W 40/08*    (2012.01)
(Continued)

(52) U.S. Cl.
CPC ............ *B60W 40/08* (2013.01); *B60C 23/02* (2013.01); *B60K 35/00* (2013.01); *B60K 37/02* (2013.01); *G06K 9/00845* (2013.01); *B60K 2350/1028* (2013.01); *B60K 2350/1076* (2013.01); *B60W 2040/0872* (2013.01)

(58) Field of Classification Search
CPC .......... B60W 40/08; B60W 2040/0872; B60K 35/00; B60K 37/02; B60K 2350/1076; B60K 2350/1028; B60K 37/06; B60K 2350/906; B60K 2350/1032; G06K 9/00845; B60C 23/02; H04M 1/72522; H04M 1/7253; H04M 2250/02; H04M 2250/10; H04M 1/6091; H04M 2250/06; H04W 4/046; G08G 1/096775;
(Continued)

(56) References Cited

U.S. PATENT DOCUMENTS 5,926,087 A * 7/1999 Busch ................. B60C 23/0401
340/438
8,907,803 B2 * 12/2014 Martin ................... G01N 33/00
340/632
(Continued)

FOREIGN PATENT DOCUMENTS

FR        2986642 A1    8/2013
GB        2486168 A     6/2012
WO   WO 2016/198970 A1   12/2016

OTHER PUBLICATIONS

Extended European Search Report in counterpart European Patent Application No. 18181783.4 dated Oct. 23, 2018.

*Primary Examiner* — Anh V La
(74) *Attorney, Agent, or Firm* — Finnegan, Henderson, Farabow, Garrett & Dunner, LLP (57) ABSTRACT

Methods and apparatus for monitoring conditions associated with a vehicle or an occupant of the vehicle are disclosed. The methods may include receiving, via a receiver, data relating to an internal condition of the vehicle. The methods may also include displaying, on a display panel, information related to the internal condition based on the received data. The display panel is physically integrated with the receiver and detachable from the vehicle.

18 Claims, 4 Drawing Sheets

(51) Int. Cl.
*G06K 9/00* (2006.01)
*B60K 37/02* (2006.01)
*B60C 23/02* (2006.01)
*B60K 35/00* (2006.01)

(58) Field of Classification Search
CPC ............. G08G 1/167; G08G 1/096741; G08G 1/096716; H04L 67/12
USPC .......................... 340/576, 438, 439, 445–449
See application file for complete search history.

(56) References Cited

U.S. PATENT DOCUMENTS

| | | | |
|---|---|---|---|
| 2010/0225493 A1* | 9/2010 | Zishaan | F24F 11/30 340/627 |
| 2013/0157647 A1* | 6/2013 | Kolodziej | H04W 4/046 455/419 |
| 2014/0195477 A1* | 7/2014 | Graumann | G06K 9/00369 707/609 |
| 2015/0012170 A1 | 1/2015 | Pita-Gil et al. | |
| 2015/0251660 A1* | 9/2015 | Nelson | B60K 28/063 340/576 |
| 2016/0090055 A1 | 3/2016 | Breed | |
| 2017/0013188 A1* | 1/2017 | Kothari | B60R 11/0235 |

* cited by examiner

INTEGRATED VEHICLE MONITORING SYSTEM

CROSS-REFERENCE TO RELATED APPLICATION

This application is based upon and claims priority from Chinese Patent Application No. 201710547320.2, filed on Jul. 6, 2017, the disclosure of which is expressly incorporated herein by reference in its entirety.

TECHNICAL FIELD

The present disclosure generally relates to smart vehicle technology, and more specifically to an integrated vehicle monitoring system.

BACKGROUND

The rapid development of smart vehicle technology provides vehicle operators with more and more driver assistance applications to ensure that abnormal situations are automatically detected and immediately brought to the attention of the operators and/or remote vehicle service centers (e.g., a roadside assistance provider). Various sensors may be installed on a vehicle to detect specific situations.

For example, a Tire Pressure Monitoring System (TPMS) may be used to detect the tire pressures of a vehicle. The TPMS requires one or more pressure sensors mounted on the tires of the vehicle, a wireless receiver, and a display panel. The pressure sensors transmit signals to the wireless receiver, which in turn sends the signs to the display panel for displaying the tire pressure information. Conventionally, the wireless receiver is physically separated from the display panel. This arrangement multiplies the difficulty of installing and servicing the TPMS, as well as occupying the precious space inside the vehicle.

The disclosed methods and systems address one or more of the problems listed above.

SUMMARY

Consistent with one embodiment of the present disclosure, a monitoring method for a vehicle is provided. The method may include receiving, via a receiver, data relating to an internal condition of the vehicle. The method may also include displaying, on a display panel, information related to the internal condition based on the received data. The display panel is physically integrated with the receiver and detachable from the vehicle.

Consistent with another embodiment of the present disclosure, a monitoring device for a vehicle is provided. The device may include a receiver. The device may also include a display panel physically integrated with the receiver and detachable from the vehicle. The device may further include a controller configured to: receive, via the receiver, data relating to an internal condition of the vehicle; and display, on the display panel, information related to the internal condition based on the received data.

Consistent with yet another embodiment of the present disclosure, a monitoring system for a vehicle is provided. The system may include a sensor configured to generate data relating to an internal condition of the vehicle. The system may also include a receiver. The system may also include a display panel physically integrated with the receiver and detachable from the vehicle. The system may further include a controller configured to: receive, via the receiver, the data generated by the sensor; and display, on the display panel, information related to the internal condition based on the received data.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The term "internal condition" in this disclosure, when used in conjunction with "vehicle," refers to conditions associated with the automotive parts or the seating/cargo area of a vehicle. For example, the conditions associated with the automotive parts may include tire pressure, engine pressure, motor speed, etc. As another example, the conditions associated with the seating/cargo area may include states of the occupants (e.g., driver, passengers, and/or pets) in the vehicle, air quality in the vehicle, occupancy in the trunk, etc. In contrast, the term "external condition" in this disclosure, when used in conjunction with "vehicle," refers to conditions related to the external environment of a vehicle. For example, the external conditions of a vehicle may include objects (e.g., pedestrians, other vehicles, trees) surrounding the vehicle. The external conditions of the vehicle may also include the physical location, such as Global Positioning System (GPS) coordinates, of the vehicle.

Figure 1:
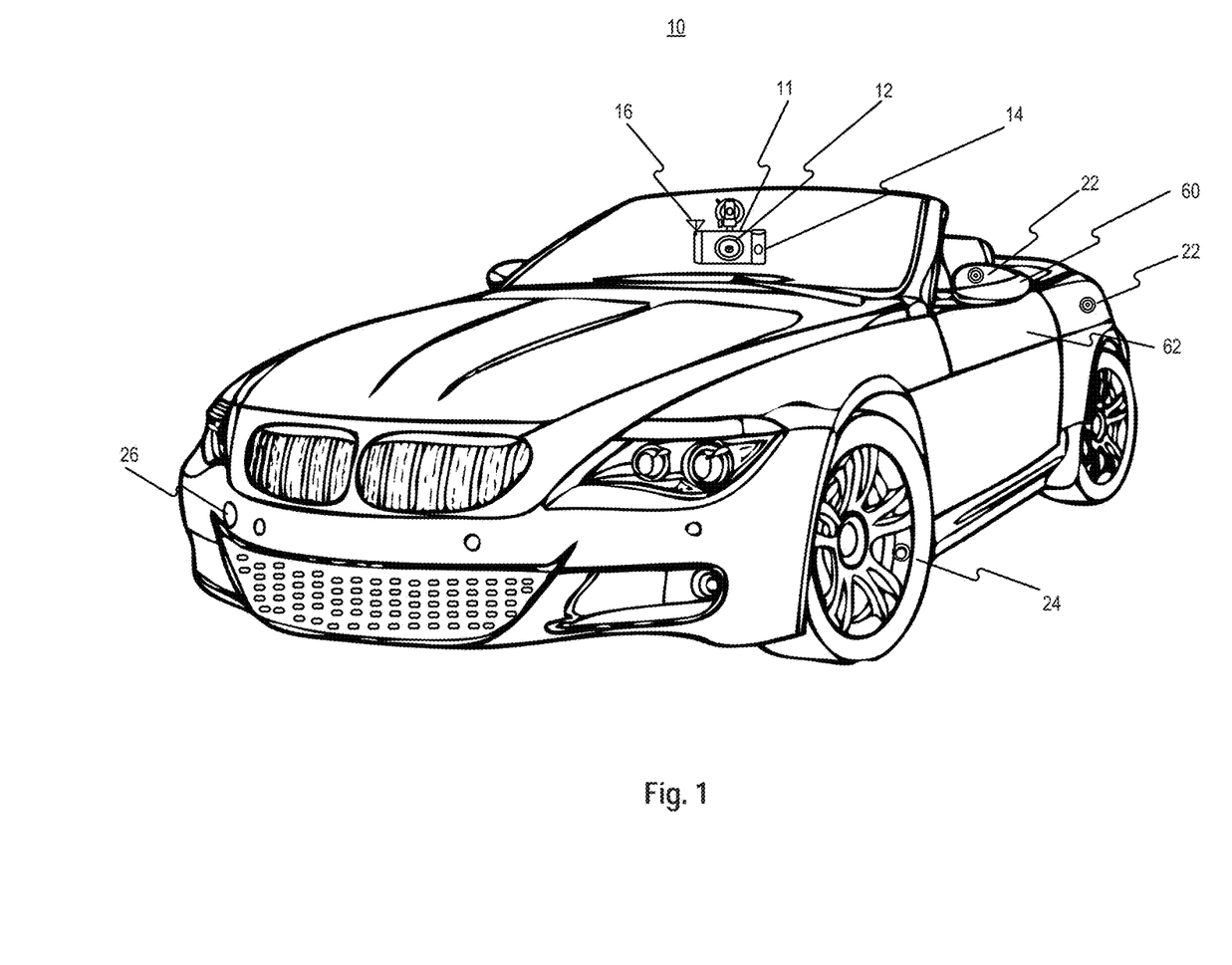
FIG. 1 is a schematic diagram illustrating an exterior view of a vehicle, according to an exemplary embodiment.

FIG. 1 is a schematic diagram illustrating an exterior view of a vehicle 10, according to an exemplary embodiment. Vehicle 10 may be embodied by a machine or vehicle that performs some type of operation. For example, vehicle 10 may be a passenger car, such as a sedan, a coupe, a convertible, a pick-up truck, a minivan, or a sports utility vehicle (SUV). Vehicle 10 may be an electric vehicle, a fuel cell vehicle, a hybrid vehicle, or a conventional combustion engine vehicle. Vehicle 10 may be configured to be operated by a driver occupying vehicle 10, remotely controlled, and/or autonomously operated. Although FIG. 1 shows vehicle 10 as a wheeled passenger car, it is contemplated the technical solutions provided by the present disclosure can be used in any type of machine. For example, vehicle 10 may be an industrial machine, such as a haul truck, an excavator, a dozer, a loader, or a motor grader. In addition, vehicle 10 may be a train, a marine vessel, an airplane, a manned or unmanned aerial vehicle, etc.

Referring to FIG. 1, vehicle 10 may include a vehicle safety monitor 11 mounted in or on vehicle 10, for example, attached to the windshield of vehicle 10 or affixed on the dashboard of vehicle 10. Vehicle safety monitor 11 may be configured to monitor either or both the external and internal conditions of vehicle 10. Vehicle safety monitor 11 may include an outward-facing camera 12, a detection and ranging device 14, and a wireless transceiver 16.

Camera 12, and any other cameras disclosed herein, may include any of optical devices, lens, charge coupled devices (CCD), complementary metal-oxide-semiconductor (CMOS) detector arrays and driving circuitry, and other arrangements of optical components, electronic components, and control circuitry used in transmitting and receiving light of various wavelengths. Camera 12 faces outside of vehicle 10 to generate image data associated with the actual environment of vehicle 10. The images may include, for example, video or still images. Camera 12 may carry various features suitable for image recording on a vehicle. In one embodiment, camera 12 may use a 3MP (megapixel) light sensor, which is sensitive to the light conditions at nighttime, in tunnels, or in underground parking lots. Camera 12 may also use F1.8 aperture lens that is suitable for low light recording. Camera 12 may also have a wide field of view, such as a 165° viewing angle. Camera 12 may further be configured to record videos with various resolutions and frame rates, such as 1296p at 30 fps, and 1080p at 30 fps or 60 fps. The images captured by camera 12 may be stored in and processed by vehicle safety monitor 11. The processed image data may be presented on one or more displays (e.g., a 2-D or 3-D monitor) located inside vehicle 10.

Detection and ranging device 14 may be any type of sensor known in the art for detecting and ranging (locating) objects. For example, detection and ranging device 14 may include a radio detecting and ranging (RADAR) device, a sound navigation and ranging (SONAR) device, a light detection and ranging (LIDAR) device, and/or a radio-frequency identification (RFID) device used to detect objects in the actual environment of vehicle 10. Vehicle safety monitor 11 may process the object data generated by detection and ranging device 14 to size and range (i.e., to locate) the objects. In one embodiment, detection and ranging device 14 may include an emitter (e.g., a laser) that emits a detection beam (e.g., a laser beam), and an associated receiver that receives a reflection of that detection beam. Based on characteristics of the reflected beam, a distance and a direction from an actual sensing location of detection and ranging device 14 on vehicle 10 to a portion of a sensed physical object (e.g., another vehicle) may be determined. In this manner, detection and ranging device 14 may be used to detect the distance from vehicle 10 to other objects, vehicles, and pedestrians.

Wireless transceiver 16 is configured to perform two-way communication between vehicle safety monitor 11 and various components of vehicle 10, including various sensors and controllers of vehicle 10. For example, wireless transceiver 16 may include a wireless router, a Bluetooth antenna, and/or a near field communication (NFC) signal transceiver. In some embodiments, vehicle safety monitor 11 may also communicate with other systems and components in vehicle 10 in a wired manner. For example, vehicle safety monitor 11 may be connected, via a data cable, to a Local Area Network (LAN) or Controller Area Network (CAN) system of vehicle 10.

In some embodiments, vehicle safety monitor 11 may also include positioning sensors. For example, vehicle safety monitor 11 may include a GPS receiver 18 (not shown) that receives signals from GPS satellites. Based on the received GPS signals, vehicle safety monitor 11 may determine a real-time position, speed, velocity, and/or heading of vehicle 10. For another example, vehicle safety monitor 11 may include an inertial measurement unit (IMU) 20 (not shown) that provides angular rates and acceleration of vehicle safety monitor 11 (i.e., vehicle 10). IMU 20 may be a 6-degree of freedom (6 DOF) IMU that consists of a 3-axis accelerometer, 3-axis angular rate gyros, and sometimes a 2-axis inclinometer. The 3-axis angular rate gyros may provide signals indicative of the pitch rate, yaw rate, and roll rate of vehicle safety monitor 11. The 3-axis accelerometer may provide signals indicative of the acceleration of vehicle safety monitor 11 in the x, y, and z directions.

In addition to camera 12, detection and ranging device 14, GPS receiver 18, and IMU 20 on vehicle safety monitor 11, vehicle 10 may include other sensors configured to monitor the operation condition of vehicle 10. For example, vehicle 10 may include any number of outward-facing cameras 22 at a variety of locations on the outer surface of vehicle 10, such as on side-view mirrors 60, on body frame 62 of vehicle 10, and at the rear bumper (not shown) of vehicle 10. The image data generated by cameras 22 may be combined to provide a comprehensive view about the actual environment surrounding vehicle 10. For example, cameras 22 may capture images about the road conditions on both sides of and behind vehicle 10.

For another example, vehicle 10 may include any number of tire pressure sensors 24 configured to detect one or more tire pressures of vehicle 10. Vehicle 10 may also include one or more proximity sensors 26 configured to generate a signal based on the proximity of objects (e.g., other vehicles) around vehicle 10.

For yet another example, vehicle 10 may further include a power source sensor 28 associated with the power source of vehicle 10, one or more motor sensors 30 associated with the motor(s) of vehicle 10, a transmission sensor 32 associated with the transmission of vehicle 10, and a braking sensor 34 associated with the braking system of vehicle 10 (not shown). One or more these sensors may be configured to detect parameters, such as state of charge, vehicle speed, vehicle acceleration, differential speed, braking frequency, and/or steering.

Figure 2:
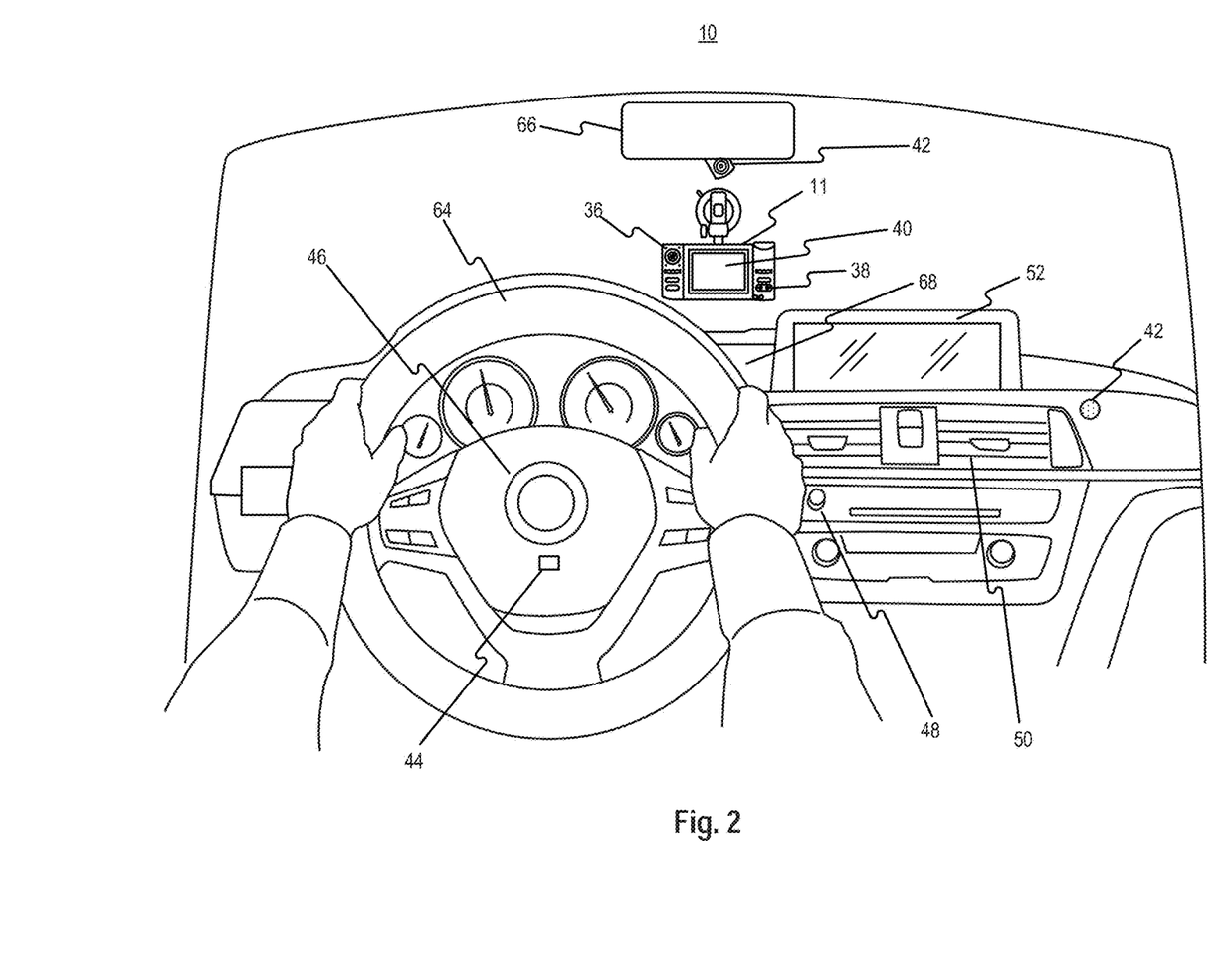
FIG. 2 is a schematic diagram illustrating an interior view of the vehicle in FIG. 1, according to an exemplary embodiment.

FIG. 2 is a schematic diagram illustrating an interior view of vehicle 10 shown in FIG. 1, according to an exemplary embodiment. Referring to FIG. 2, vehicle safety monitor 11 may also include an inward-facing camera 36, a microphone 38, and a display 40.

Camera 36 may be configured to capture images of the interior of vehicle 10 and generate a signal to be processed to visually detect the presence of occupants of vehicle 10. In particular, camera 36 may capture an operator (i.e., driver) and/or occupants of front seats of vehicle 10. For example, camera 36 may be used in conjunction with image recognition software carried by vehicle safety monitor 11, such that the software may distinguish a person from inanimate objects, and may determine an identity of certain people based on physical appearances. In some embodiments, the image recognition software may include facial recognition software and may be configured to recognize facial features and determine the age (e.g., by determining size and facial features) of occupants based on the images. The image recognition software may also be configured to recognize gestures, such as head movement, eye movement, eye closure, dilated pupils, glossy eyes, hands removed from steering wheel 64, and/or hands performing other tasks, such as eating, holding a cell phone, and/or texting. The image recognition software may also be configured to detect characteristics of animals. Camera 36 may be configured to be adjusted by a motor (not shown) to improve an image of the occupant(s). For example, the motor may be configured to pan or tilt camera 36 to substantially center the occupant(s) in the frame. The motor may also be configured to adjust the focal point of the camera 36 to substantially focus on the facial features of the occupant(s).

Microphone 38 may include any structure configured to capture audio, and generate and record audio signals of the interior of vehicle 10. For example, microphone 38 may be configured to capture voices from the occupant(s) of vehicle 10. Microphone 38 may be used in conjunction with speech recognition software carried by vehicle safety monitor 11, such that the software may determine an identity of certain people based on characteristics of the captured voices. The speech recognition software may also determine the state of an occupant based on the captured voices. For example, when the speech recognition software detects a constantly slurred speech from the operator of vehicle 10, the speech recognition software may determine that the operator is drunk and is not suitable for driving vehicle 10.

Display 40 may be configured to output images, videos, and/or other types of visual information. Display 40 may include a Liquid Crystal Display (LCD), a Light Emitting Diode (LED) display, a plasma display, or any other type of display. Display 40 may also provide a Graphical User Interface (GUI) or a touchscreen for user input. Vehicle safety monitor 11 may display on display 40 the information received from various sensors. For example, vehicle safety monitor may receive the signals generated by tire pressure sensors 24 via wireless transceiver 16, and display the readings of the tire pressures on display 40.

In addition to camera 36 on vehicle safety monitor 11, vehicle 10 may also include any number of inward-facing cameras 42 at a variety of locations inside vehicle 10, such as on rear-view mirror 66, a ceiling (not shown), headrests of the front seats (not shown), and/or structure pillars (not shown) of vehicle 10. Cameras 42 may capture images of occupants, such as facial features of occupants, of both the front seats and the back seats of vehicle 10.

Vehicle 10 may also include a breathalyzer 44 and a dispenser 46 located on steering wheel 64. Breathalyzer 44 is configured to detect the blood alcohol content in the breath of the operator of vehicle 10. Dispenser 46 is configured to contain and spray sober medication and/or fragrance. In one embodiment, vehicle safety monitor 11 may receive signals generated by breathalyzer 44 and display the blood alcohol concentration of the operator on display 40. If the blood alcohol concentration exceeds the limit for safe driving, vehicle safety monitor 11 may generate an alarm sound, warning the operator not to operate vehicle 10. Moreover, vehicle safety monitor 11 may control dispenser 46 to spray the sober medication, in order to reduce the operator's level of intoxication.

Vehicle 10 may also include an air quality detector 48 and an air purifier 50. Air quality detector 48 is configured to detect the air quality inside vehicle 10, including at least one of an air-quality index (AQI), content of fine particles, content of inhalable particles, content of sulfur dioxide, content of nitrogen dioxide, content of ozone, and content of carbonic monoxide. Air purifier 50 may be part of the air ventilation system of vehicle 10. Air purifier 50 is configured to purify the air and increase the air circulation inside vehicle 10. In one embodiment, vehicle safety monitor 11 may receive the signals generated by air quality detector 48 and display the air quality information on display 40. If the air quality level is below a predetermined acceptable level, vehicle safety monitor 11 may activate air purifier 50. Moreover, if the content of certain harmful substances, such as carbonic monoxide, exceeds the safe limit, vehicle safety monitor 11 may generate an alarm sound, reminding occupants of vehicle 10 to leave vehicle 10.

Vehicle 10 may also include a user interface 52 housed in dashboard 68. User interface 52 is configured to receive input from a user and transmit data to various control systems of vehicle 10. User interface 52 may include a display panel similarly configured as display 40. User interface 52 may have a bigger display area than display 40, and therefore sometimes may be used to display images that are too big for display 40. Vehicle safety monitor 11 may send data to user interface 52 for displaying. User interface 52 may further include input devices, such as a touchscreen, a keyboard, a mouse, and/or a tracker ball. User interface 52 may be configured to receive user-defined settings. User interface 52 may further include common car speakers and/or separate speakers configured to transmit audio.

It is contemplated that vehicle 10 may include additional sensors other than cameras 12, 22, 36, and 42, detection and ranging device 14, GPS receiver 18, IMU 20, tire pressure sensor 24, proximity sensor 26, power source sensor 28, motor sensor 30, transmission sensor 32, braking sensor 34, microphone 38, breathalyzer 44, and air quality detector 48, described above. For example, vehicle may further include a seat belt sensor (not shown) functionally associated with a buckle in each seat belt of vehicle 10. Each seat belt sensor is configured to generate a signal indicative of the status of the corresponding seat belt.

It is also contemplated that the sensors described in the present disclosure may be integrated into or separated from vehicle safety monitor 11. For example, although FIG. 2 shows breathalyzer 44 being located on steering wheel 64 and microphone 38 being a part of vehicle safety monitor 11. In some embodiments, breathalyzer 44 may be instead integrated into vehicle safety monitor 11, while microphone 38 may be housed in dashboard 68.

In exemplary embodiments, vehicle safety monitor 11 may be manufactured and sold as an independent and portable device. Moreover, vehicle safety monitor 11 may be easily installed in or detached from vehicle 10. Vehicle safety monitor 11 may carry its own sensors, such as camera 12 and 36, and microphone 38. Vehicle safety monitor 11 may also receive signals generated by sensors, such as tire pressure sensor 24, that are physically separated from vehicle safety monitor 11. After being installed on vehicle 10, vehicle safety monitor 11 may form a wireless communication with each of the separated sensors and receive data from the sensors via the wireless communication. Vehicle safety monitor 11 may be configured to automatically connect to the sensors every time when vehicle safety monitor 11 is turned on. Vehicle safety monitor 11 may process the sensor-generated data and determine the vehicle and occupant conditions. Vehicle safety monitor 11 may display the vehicle and occupant conditions on display 40 and/or user interface 52. When needed, vehicle safety monitor 11 may be detached from vehicle 10 for upgrading the hardware and/or software of vehicle safety monitor 11, or for preventing theft of vehicle safety monitor 11. In the above-described manner, vehicle safety monitor 11 may combine the data generated by various sensors and provide a comprehensive and accurate determination about the vehicle and occupant conditions.

Figure 3:
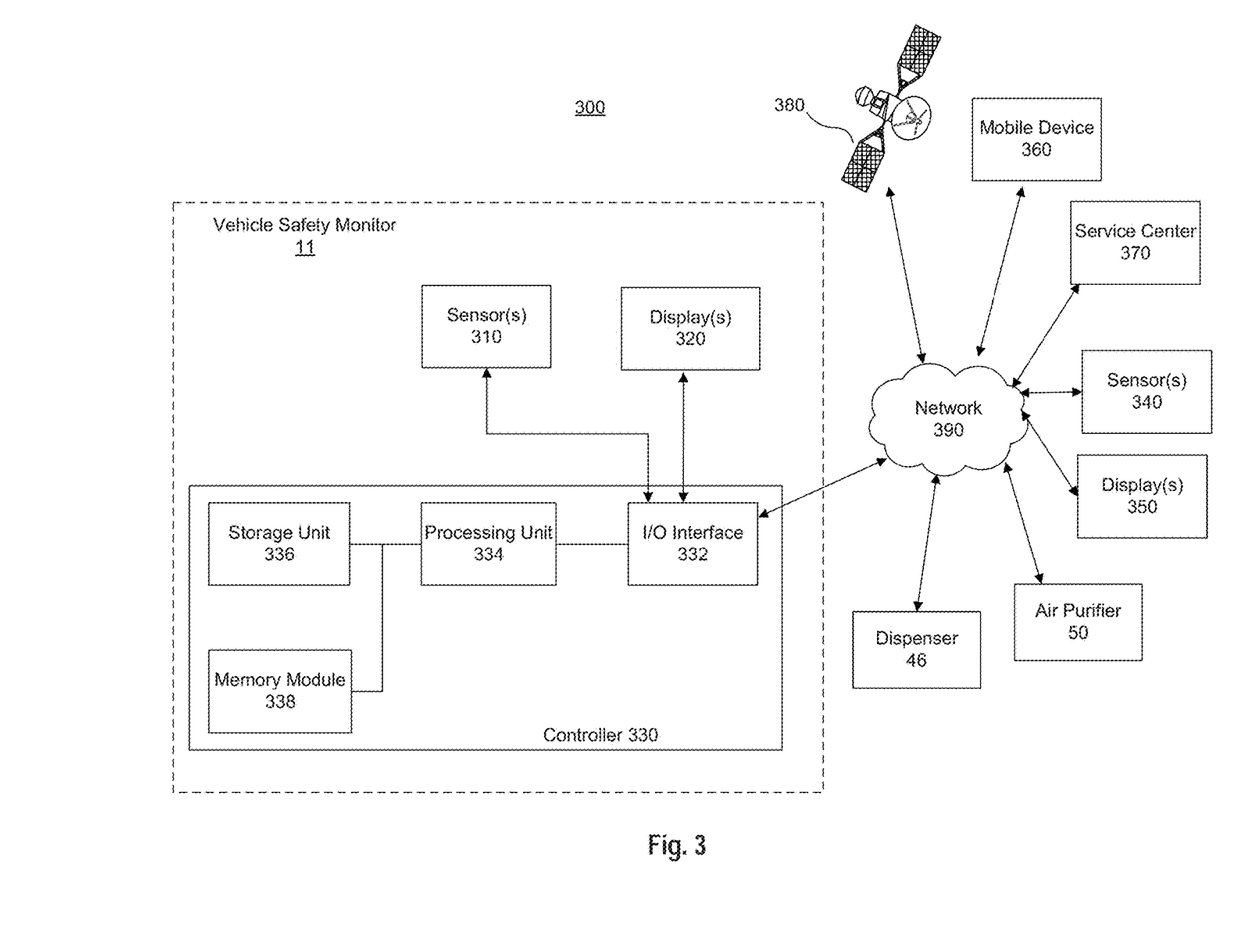
FIG. 3 is a block diagram of a vehicle monitoring system, according to an exemplary embodiment.

FIG. 3 is a block diagram of a vehicle monitoring system 300, according to an exemplary embodiment. For example, vehicle monitoring system 300 may be used in vehicle 10. Vehicle monitoring system 300 may be configured to monitor both the external and internal conditions of vehicle 10. Referring to FIG. 3, vehicle monitoring system 300 may include a vehicle safety monitor 11. Vehicle safety monitor 11 may further include one or more sensors 310, one or more displays 320, and a controller 330. Sensors 310 are physically integrated into vehicle safety monitor 11. For example, sensors 310 may include one or more of cameras 12 and 36, detection and ranging device 14, GPS receiver 18, IMU 20, and microphone 38 (FIGS. 1 and 2). Similarly, display 320 may be physically integrated into vehicle safety monitor 11. For example, display 320 may be display 40 (FIG. 2).

Vehicle monitoring system 300 may also include one or more sensors 340, one or more displays 350, a mobile device 360, a service center 370, one or more satellites 380, a network 390, dispenser 46, and air purifier 50. Sensors 340 and displays 350 are physically separated from vehicle safety monitor 11. For example, sensors 340 may include one or more of cameras 22 and 42, tire pressure sensor 24, proximity sensor 26, power source sensor 28, motor sensor 30, transmission sensor 32, braking sensor 34, breathalyzer 44, and air quality detector 48 (FIGS. 1 and 2). Display 350 may be user interface 52 (FIG. 2).

Controller 330 may include, among other things, an input/output (I/O) interface 332, a processing unit 334, a storage unit 336, and/or a memory module 338. These units may be configured to transfer data and send or receive instructions between or among each other.

I/O interface 332 may be configured for two-way communication between controller 330 and various components of vehicle monitoring system 300, such as sensors 310 and 340. I/O interface may also send and receive data carried by operating signals to and from displays 320 and 350, mobile device 360, service center 370, dispenser 46, and air purifier 50. I/O interface 332 may send and receive data between each of the devices via communication cables, wireless networks, or other communication mediums. For example, sensors 340 may be configured to send and receive signals to I/O interface 332 via network 390. Network 390 may be any type of wired or wireless network that may allow transmitting and receiving data. For example, network 390 may be a nationwide cellular network, a local wireless network (e.g., Bluetooth, WiFi, or LiFi), and/or a wired network. Processing unit 334 may be configured to receive signals and process the signals to determine a plurality of conditions regarding vehicle 10 and the occupants in vehicle 10. Processing unit 334 may also be configured to generate and transmit command signals, via I/O interface 332, in order to actuate the devices in communication.

Storage unit 336 and/or memory module 338 may be configured to store one or more computer programs that may be executed by controller 330 to perform functions of vehicle monitoring system 300. For example, storage unit 336 and/or memory module 338 may store image recognition software configured to determine the identity of individuals based on the facial and behavior features. Storage unit 336 and/or memory module 338 may further store data and/or look-up tables used by processing unit 334. For example, storage unit 336 and/or memory module 338 may be configured to include data profiles of people related to vehicle 10. For another example, storage unit 336 and/or memory module 338 may be configured to include the safe limits for blood alcohol concentration of the vehicle operator and carbon monoxide concentration in vehicle 10.

Consistent with the present disclosure, processing unit 334 may be configured to receive the signals generated by a sensor, determine a condition based on the signals, and display the condition on a display device. For example, after receiving the signals generated by one or more tire pressure sensors 24, processing unit 334 may determine the pressures in respective tires based on the signals. Processing unit 334 may then display the tire pressure information on display 320 (i.e., a display physically integrated into vehicle safety monitor 11). In some embodiments, processing unit 334 may also transmit the tire pressure information to display 350 and/or mobile device 360 (i.e., a display physically separated from vehicle safety monitor 11), and control display 350 and/or mobile device 360 to display the information. Processing unit 334 may also determine whether the tire pressures fall outside a safe limit. If it is determined that the tire pressures are too high or too low, processing unit 334 may display a warning message on the displays. Alternatively or in combination, processing unit 334 may generate an alarm sound via a speaker, such as the speaker of user interface 52.

For another example, processing unit 334 may track the position of vehicle 10 based on GPS signals generated by GPS receiver 18. Processing unit 334 may display the location, speed, and traveling route of vehicle 10 on displays 320 and/or 350. Processing unit 334 may also display, based on the signals generated by cameras 12 and 22, the actual environment surrounding vehicle 10 on displays 320 and/or 350. The displayed GPS information and image information can be used to assist the operator of vehicle 10 in making driving decisions.

Processing unit 334 may also be configured to determine an operating condition based on behavior of the operator of vehicle 10. For example, based on the eye movement of the operator, which is captured by cameras 36 and 42, processing unit 334 may be configured to determine whether the operator is distracted, for example, texting while driving. Processing unit 334 may similarly determine abnormal driving behavior of the operator, for example, resulting from immediate health problems. Other conditions determined by processing unit 334 may include dilated pupils, tiredness, dizziness, and/or extended periods of eye closure. Processing unit 334 may also be configured to combine the behavior of the operator and operation status of vehicle 10 to make accurate decisions. For example, if the GPS information indicates vehicle 10 is swerving and processing unit 334 also detects dilated pupils, processing unit 334 may determine the occurrence of an urgent condition (e.g., drunken driving). Based on such determination, processing unit 334 make take appropriate actions, such as generating an alarm sound to warn the operator, transmitting an emergency message to service center 370, or activate an autonomous driving function of vehicle 10.

Processing unit 334 may also be configured to determine the identity of an operator of vehicle 10 based on facial and behavior features of the operator. For example, processing unit 334 may extract the facial and behavior features of the operator from the images captured by cameras 36 and 42. Processing unit 334 may then compare the extracted features with the pre-stored facial and behavior features associated with the owner of vehicle 10. If the extracted features do not match the pre-stored features, processing unit 334 may determine that the operator is not the owner of vehicle 10. In one embodiment, mobile device 360 belongs to the owner of vehicle 10, and processing unit 334 may transmit a warning message and/or a face image of the operator to mobile device 360, indicating that vehicle 10 is currently operated by someone else.

Processing unit 334 may be configured to determine the vehicle and occupant conditions based on computer learning (e.g., predictive models). The predictive models may be trained using extracted feature data corresponding to known conditions. For example, cameras 36 and 42 may capture an image, which may be processed with facial recognition software to extract the occupant's eye movement. The extraction of the eye movement may include processing data points corresponding to direction of the eyes of the driver. Processing unit 334 may train the predictive models using eye movements that correspond to known safe or unsafe conditions. Processing unit 334 may then apply the predictive models on the extracted feature data to determine the presence of unsafe conditions, such as texting while driving. The predictive models may be unique to each occupant, and may be continually updated with additional data and determined operations to enhance the accuracy of the determinations. In some embodiments, the predictive models can be trained with multiple feature data.

Processing unit 334 may also transmit the detected vehicle and occupant conditions to service center 370 for further processing. For example, when vehicle 10 runs into an emergency or accident, processing unit 334 may send the GPS information, images about the actual environment surrounding vehicle 10, and/or images about the interior condition of vehicle 10 to service center 370, so that service center 370 may accurately determine the location and condition of vehicle 10 and render the assistance accordingly. For another example, if the owner of vehicle 10 cannot find vehicle 10, the owner may use mobile device 360 to remotely control the processing unit 334 to send the GPS information of vehicle 10 to mobile device 360, so that the owner may locate vehicle 10.

Figure 4:
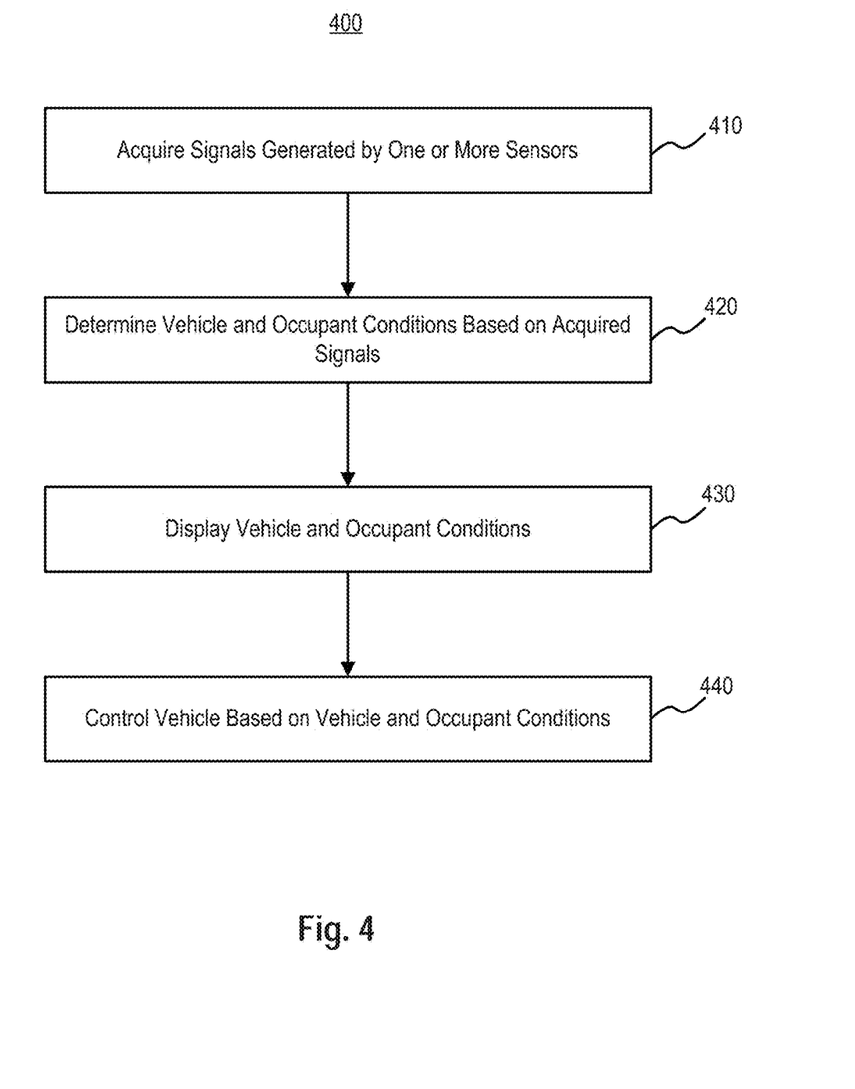
FIG. 4 is a flowchart of a process for using the vehicle monitoring system in FIG. 3, according to an exemplary embodiment.

FIG. 4 is a flowchart of a process 400 for using a vehicle monitoring system, according to an exemplary embodiment. For example, process 400 may be applied to vehicle monitoring system 300. Process 400 may be used to monitor both the external and internal conditions of vehicle 10. Referring to FIG. 4, process 400 may include the following steps.

In step 410, controller 330 acquires signals generated by one or more sensors 310 and 340. Because sensors 340 are physically separated from vehicle safety monitor 11, controller 330 may receive the signals generated by sensors 340 via network 390.

In step 420, controller 330 determines the vehicle and occupant conditions based on the acquired signals. For example, controller 330 may determine the tire pressure levels based on the signals generated by tire pressure sensors 24. Controller 330 may also determine the behavior and facial features of the operator of vehicle 10, based on images captured by cameras 36 and 42.

In step 430, controller 330 displays the vehicle and occupant conditions. Controller 330 may display the conditions on display 320 that is physically integrated into vehicle safety monitor 11. Controller 330 may also remotely control display 340, which is physically separated from vehicle safety monitor 11, to display the conditions. Controller 330 may further send the conditions to mobile device 360 for display.

In step 440, controller 330 controls vehicle 10 based on the vehicle and occupant conditions. For example, if controller 330 determines that the operator is drunk based on the signals generated by breathalyzer 44, controller 330 may remotely control dispenser 46 to spray the sober medication to sober up the operator, or activate the autonomous driving system of vehicle 10. For another example, if controller 330 determines that the air quality in vehicle 10 deteriorates, controller 330 may remotely activate air purifier 50.

The disclosed embodiments provide a convenient way for a vehicle operator to customize various vehicle monitoring applications. In particular, the disclosed vehicle monitoring system physically integrates a display panel, a signal receiver and/or transmitter, and various sensors in a single device. Such device also wirelessly communicates with other sensors that are separated from the device.

This integrated system provides several advantages. First, the system reduces the hardware/software complexity and redundancy, and minimizes the space occupied. Second, the system integrates the data generated by different sensors to make more accurate decisions regarding the vehicle conditions. Third, the system can be installed and set up by a lay person, without relying on experienced technicians. Fourth, the system can be conveniently reconfigured to incorporate newly added sensors and/or applications.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A monitoring method performed by a vehicle monitor, comprising:
   receiving, via a wireless receiver of the vehicle monitor, data relating to an internal condition of a vehicle, wherein receiving the data comprises receiving data indicative of tire pressure of the vehicle from a tire pressure sensor;
   acquiring, via a camera of the vehicle monitor, image data representing a scene outside the vehicle; and
   displaying, on a display panel of the vehicle monitor, the image data and information relating to the internal condition, the displayed information relating to the internal condition comprising a tire pressure level;
   wherein the wireless receiver, the display panel, and the camera are physically integrated in the vehicle monitor, the vehicle monitor being detachable from the vehicle.

2. The method of claim 1, wherein receiving the data relating to the internal condition comprises:
   receiving the data via radio frequency signals.

3. The method of claim 1, further comprising:
   transmitting the information relating to the internal condition, via a transmitter, to a mobile device for display.

4. The method of claim 1, wherein:
the internal condition includes air quality in the vehicle; and
displaying the information relating to the internal condition comprises displaying an air quality level on the display panel.

5. The method of claim 4, further comprising:
determining that the air quality level has reached a predetermined level; and
activating an air purifier based on the determination.

6. The method of claim 1, wherein the internal condition of the vehicle comprises:
a condition associated with at least one of an automotive part of the vehicle or an occupant of the vehicle.

7. The method of claim 6, further comprising:
determining, based on the data relating to the internal condition, a blood alcohol concentration of the occupant.

8. The method of claim 6, further comprising:
extracting, from the data relating to the internal condition, features associated with the vehicle or the occupant; and
determining the internal condition based on the extracted features.

9. The method of claim 8, further comprising:
determining an identity of the occupant based on the extracted features.

10. The method of claim 8, further comprising:
determining that the internal condition is indicative of an abnormal driving behavior of the occupant.

11. A monitoring device for a vehicle, comprising:
a wireless receiver;
a display panel;
a camera; and
a controller configured to:
receive, via the wireless receiver, data relating to an internal condition of the vehicle;
acquire, via the camera, image data representing a scene outside the vehicle; and
display, on the display panel, the image data and information related to the internal condition;
wherein the controller is further configured to:
receive, via the wireless receiver, data indicative of tire pressure of the vehicle from a tire pressure sensor;
determine a tire pressure level based on the data received from the tire pressure sensor; and
display the tire pressure level on the display panel, and
wherein the wireless receiver, the display panel, and the camera are physically integrated in the monitoring device, the monitoring device being detachable from the vehicle.

12. The device of claim 11, wherein the receiver is configured to receive data via radio frequency signals.

13. The device of claim 11, further comprising:
a transmitter;
wherein the controller is further configured to:
transmit the information relating to the internal condition, via the transmitter, to a mobile device for display.

14. The device of claim 11, wherein the internal condition of the vehicle comprises:
a condition associated with at least one of an automotive part of the vehicle or an occupant of the vehicle.

15. The device of claim 14, wherein the controller is further configured to:
determine, based on the data relating to the internal condition, a blood alcohol concentration of the occupant.

16. The device of claim 14, further comprising:
an imaging sensor configured to generate the data relating to the internal condition.

17. The device of claim 14, wherein the controller is further configured to:
extract, from the data relating to the internal condition, features associated with at least one of the vehicle or the occupant; and
determine the internal condition based on the extracted features.

18. A monitoring system for a vehicle, comprising:
a first sensor configured to generate data relating to an internal condition of the vehicle; and
a monitoring device, comprising:
a camera;
a wireless receiver;
a display panel; and
a controller configured to:
receive, via the wireless receiver, the data generated by the first sensor;
acquire, via the camera, image data representing a scene outside the vehicle; and
display, on the display panel, the image data and information related to the internal condition,
wherein the first sensor is a tire pressure sensor, and the controller is further configured to:
receive, via the wireless receiver, data indicative of tire pressure of the vehicle from a tire pressure sensor;
determine a tire pressure level based on the data received from the tire pressure sensor; and
display the tire pressure level on the display panel, and
wherein the wireless receiver, the display panel, and the camera are physically integrated in the monitoring device, the monitoring device being detachable from the vehicle.

* * * * *